A. N. & DeW. C. NORRIS.
Seeding Machine.
No. 233,111.    Patented Oct. 12, 1880.
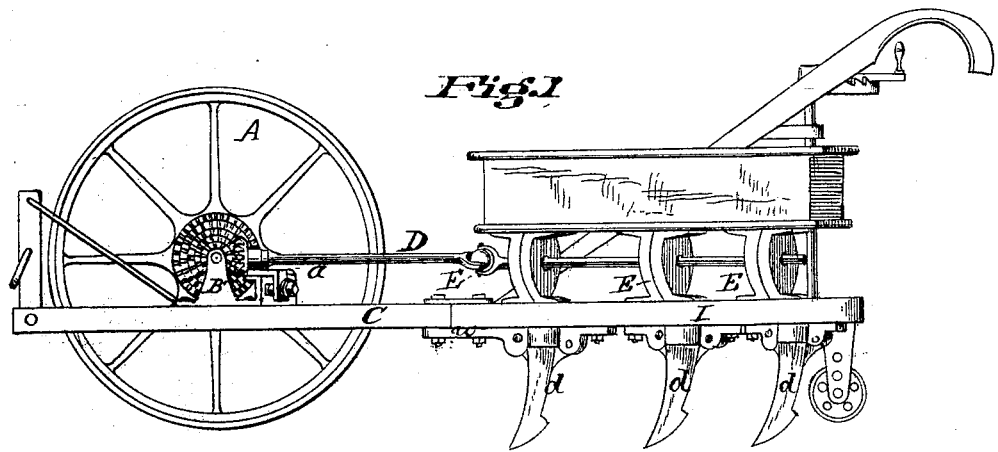
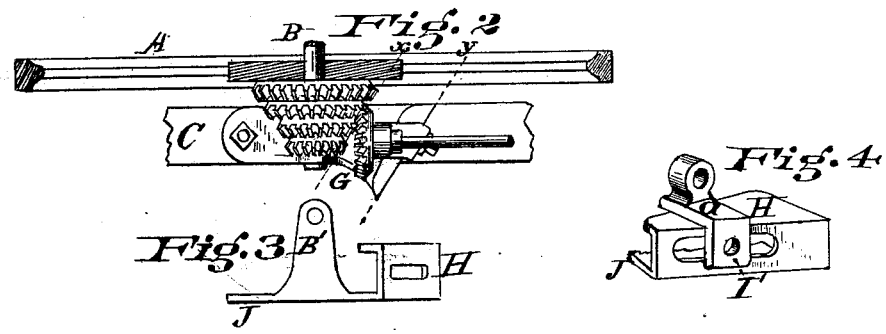
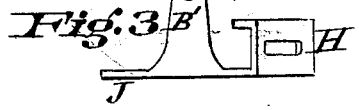
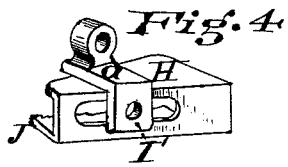
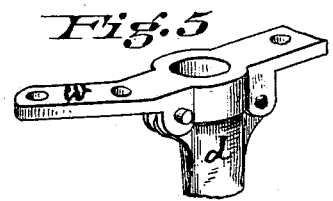
Attest
Wm Nicholson Turner
John K. Love
Inventors
Albert N. Norris
Dewitt C. Norris
By H. K. Peck
Atty.

UNITED STATES PATENT OFFICE.

ALBERT N. NORRIS AND DEWITT C. NORRIS, OF RUSHVILLE, INDIANA.

SEEDING-MACHINE.

SPECIFICATION forming part of Letters Patent No. 233,111, dated October 12, 1880.

Application filed November 4, 1878.

*To all whom it may concern:*

Be it known that we, ALBERT N. NORRIS and DEWITT C. NORRIS, of Rushville, in the county of Rush and State of Indiana, have invented a new and useful Improvement in Seeding-Machines, of which the following is a full, clear, and exact description, reference being had to the accompanying drawings, and to the letters of reference marked thereon.

Figure 1 represents a side elevation of our machine. Fig. 2 represents a plan view of the adjustable gearing and its relation to the frame and the driving-wheel. Fig. 3 represents the bed-plate, to which the support of the axle of the drive-wheel and the oblique rest or slotted open box for the line-shaft support are connected. Fig. 4 represents a perspective view of the slotted open box detached and the adjustable box for the line-shaft. Fig. 5 represents a perspective view of one of the hangers for securing the hoes to the side bars.

Our machine is for sowing grain between corn-rows, and is made with a central frame-piece, to each side of which hinged side bars mounted with seed-boxes and seeding mechanism are connected. But one of the side bars with its appurtenances is shown in Fig. 1.

Fig. 1 represents one half of the machine, the other half being precisely the same. The central frame-piece extends to the rear end of the machine, and is supported by a small wheel, and supports the mechanism for expanding and contracting the hinged side bars in the usual manner.

Our invention relates to the mechanism for changing the speed of the dropping mechanism.

The driving-wheel A is supported centrally in the frame-piece C, and each end of its axle B is mounted with four gear-wheels dished together, and constituting a cone-shaped nest secured together by ledges and corresponding indentations cast upon their sides, and are thereby held in their relation.

The shaft D, that operates the feed-wheels within the cups or boxes E, is jointed by a ball-and-pivot joint, F, and is mounted at its forward end with a concavo-convex gear-wheel, which can be adjusted to mesh with either of the gears constituting the nest on the drive-wheel axle. This gear-wheel is adjustable upon its shaft, so as to enable it to be brought into mesh with either of the gears of the nest.

The slotted rest H, upon which shaft D has its bearing *a*, is arranged obliquely, so as to occupy a plane parallel with the line of the nest of gears, as indicated by lines *x y*, Fig. 2.

The hoes *d* are hinged to their respective hangers under the feed-wheels, and their front connection with their hangers is by a wooden break-pin. The front hanger (shown in Fig. 5) is cast with an elongated front plate, *w*, which serves the double purpose of a support for the hoe and as a hinge to connect the side bar, I, to the central frame, C.

The hollow oblique rest H and the support B′ for the axle of the driving-wheel are cast with a base-plate, J, and when secured to the frame C they will retain their fixed position. Thereby they always maintain the parallel relation of the nest of gears and the adjustable bearing *a*, in which the driving-shaft D is journaled.

The adjustment of shaft D, with its gear G, by means of set-screw I′, which works in a nut in the hollow rest H, will cause a change of speed of the feed-wheels which drop the grain through boxes E and the hoes below them.

Heretofore seed-drills to work between corn-rows have been provided with either three or five hoes, one hoe having been arranged centrally under the central frame; but experience has proven that these machines did not do their work well and uniformly, because the central line of earth between the corn-rows is left in a solid condition by the cultivator or plow after plowing the corn, and therefore the central hoe did not bury the seed of uniform depth with the side hoes. Besides, the hard condition of the central ridge of soil referred to required that greater power be used to propel the machine. Our drill avoids this difficulty by the use of two rows of hoes only, each of which performs its work independently and without throwing an undue amount of earth upon the grain deposited by the hoes in advance of it, working like the large field seed-drills, and the grain is planted in the loose and mellow soil on both sides of the narrow central ridge to an equal depth.

The ball-and-pivot joint F allows the side bars, I, to be adjusted laterally to adapt the machine to work between the rows of corn of varying width. The ball of this joint has four holes made in it, into which four pins or pivots cast in the pronged ends of the coupled shaft D are driven by percussive force.

Having described our invention, we claim—

The combination of the conically-arranged bevel-wheels on the axle B, the adjustable bevel-gear wheel G on the laterally-adjustable shaft D, the laterally-adjustable bearing $a$, and the oblique bed-plate J, having the axle-bearing B' and bearing-rest H thereon, substantially as and for the purpose herein specified.

Witness our hands this 15th day of October, A. D. 1878.

ALBERT N. NORRIS.
    DEWITT C. NORRIS.

Witnesses:
 CLAUDE CAMBERN,
 JESSE HENLEY.